US012459683B1

(12) United States Patent
Martinez et al.

(10) Patent No.: US 12,459,683 B1
(45) Date of Patent: Nov. 4, 2025

(54) APPARATUS FOR FILLING A MEDICAMENT PREPARATION VIAL

(71) Applicant: Genzyme Corporation, Cambridge, MA (US)

(72) Inventors: Alejandra Linares Martinez, Boonton, NJ (US); Martin Michael Coyne, III, Boonton, NJ (US); Katherine Ford Brigham, Boonton, NJ (US)

(73) Assignee: Genzyme Corporation, Cambridge, MA (US)

( * ) Notice: Subject to any disclaimer, the term of this patent is extended or adjusted under 35 U.S.C. 154(b) by 0 days.

(21) Appl. No.: 18/960,517

(22) Filed: Nov. 26, 2024

(51) Int. Cl.
*B65B 3/00* (2006.01)
*A61J 1/20* (2006.01)

(52) U.S. Cl.
CPC ............. *B65B 3/003* (2013.01); *A61J 1/2013* (2015.05); *A61J 1/2089* (2013.01)

(58) Field of Classification Search
CPC ........ B65B 3/003; A61J 1/2089; A61J 1/2013
See application file for complete search history.

(56) References Cited

U.S. PATENT DOCUMENTS 4,798,605 A * 1/1989 Steiner ...................... A61J 1/10 604/414
10,278,897 B2 * 5/2019 David .................. A61J 1/2013
12,213,944 B1 * 2/2025 Wu ...................... A61J 1/2062

OTHER PUBLICATIONS

Needle-based injection systems for medical use requirements and test methods, Part 1: Needle injection systems, ISO 11608 1:2014(E), Third Edition, Switzerland, ISO, Dec. 15, 2014, pp. 1-13.

* cited by examiner

*Primary Examiner* — Timothy L Maust
(74) *Attorney, Agent, or Firm* — Fish & Richardson P.C.

(57) ABSTRACT

An apparatus for filling a medicament preparation vial with a fixed volume of diluent from a storage container comprises a container, an inlet comprising an inlet spike, and an outlet comprising an outlet spike. An inlet valve located downstream of the inlet spike has a first state allowing fluid communication between the inlet and the chamber, and a second state in preventing fluid communication between the inlet and the chamber. An outlet valve located upstream of the outlet spike has a first state preventing fluid communication between the chamber and the outlet, and a second state allowing fluid communication between the chamber and the outlet. The outlet valve is in the first state when the inlet valve is in the first state, and is moveable from the first state to the second state when the inlet valve is in the first state.

20 Claims, 4 Drawing Sheets

APPARATUS FOR FILLING A MEDICAMENT PREPARATION VIAL

TECHNICAL FIELD

The present application relates to an apparatus for filling a medicament preparation vial with a fixed volume of diluent from a storage container. The present application also relates to a method of filling a medicament preparation vial with a fixed volume of diluent from a storage container using the apparatus.

BACKGROUND

Administration of medicament in a home setting offers benefits for both patients and the healthcare system. Visits to a healthcare setting for a patient are frequent and can be lengthy when taking into account commute times, waiting times, and delays. For these reasons and the added comfort of one's home, patients often prefer to receive therapy in the homes, wherever possible. This provides autonomy and improved convenience, whilst also reducing the overall burden on the healthcare system.

Medicament is often prefilled in a reservoir, such as a flexible IV container or a rigid prefilled syringe or cartridge for direct administration or subsequent addition to an IV bag with a common commodity solution. Where all patients are to receive a fixed dose, the volume may be prefilled into a single reservoir of suitable size and stored in a stable liquid formulation.

However, this is not always the case. In some instances, a vial may be used with either a liquid or lyophilised presentation. Preparation of these medicaments in a healthcare setting are undertaken in sterile environments and governed by specific guidelines. Even under these conditions, preparation of these medicaments is time consuming and error prone. Preparation also usually has to take place on a patient-specific basis at the point and time of delivery.

In the home setting, the process controls may not be in place and the admixture steps themselves may be alien and confusing to a patient. Regardless of the user's professional title, training, or preparation experience, the home environment lacks the medicament preparation infrastructure inherent to in-clinic preparations, including a sterile, well-lit preparation environment (e.g., laminar flow hood) and bulk preparation supplies (e.g., syringes, needles, gloves), Furthermore, the dosing required for each patient may be different, depending on body weight for example, and the dosing scheme may require different amounts of medicament to be delivered in subsequent infusions. In addition, the medicament is often provided in large quantities and in multiple packaged vials, which can take up large volumes of space, and sometimes required special conditions, such as being kept in a refrigerator or freezer.

SUMMARY

It is an object of the present disclosure to provide an advantageous apparatus for filling a medicament preparation vial with a fixed volume of diluent from a storage container, the apparatus comprising a container defining a chamber configured to receive a fixed volume of diluent, an inlet comprising an inlet spike configured to be removably insertable into a port of a storage container, an outlet comprising an outlet spike configured to be removably insertable into a medicament preparation vial, an inlet valve located downstream of the inlet spike, the inlet valve having a first state in which the inlet valve allows fluid communication between the inlet and the chamber and a second state in which the inlet valve prevents fluid communication between the inlet and the chamber, and an outlet valve located upstream of the outlet spike, the outlet valve having a first state in which the outlet valve prevents fluid communication between the chamber and the outlet and a second state in which the outlet valve allows fluid communication between the chamber and the outlet, wherein the outlet valve is in its first state when the inlet valve is in its first state, and wherein, when the inlet valve is in its second state, the outlet valve is moveable from its first state to its second state.

The apparatus of the present disclosure is advantageous because it enables a patient to safely and easily prepare a medicament in a home setting. The fixed volume chamber and inlet and outlet valves help to ensure that the correct amount of diluent is always dispensed.

In some embodiments, the outlet spike may be reversibly moveable in a direction towards the inlet spike such that the state of the outlet valve is changeable from its first state to its second state.

Advantageously, the reversibly moveable outlet spike allows for the apparatus to be used multiple times to dispense multiple doses of diluent. Thus, multiple fixed volumes of diluent can be dispensed for a single injection and/or multiple injections can be prepared using the same apparatus. As a result, the reusability of the apparatus is beneficial to the environment and reduces waste.

In some embodiments, the apparatus may further comprise a valve mechanism that forms a part of the inlet valve and outlet valve, the valve mechanism comprising a release element configured to control fluid flow out of the chamber, and a stopper element configured to control fluid flow into the chamber.

Advantageously, the release element and stopper element can control fluid flow into and out of the chamber to ensure that fluid flow is always in the desired direction and that the correct fixed volume of liquid is dispensed on each use of the apparatus.

In some embodiments, the valve mechanism may be configured to move the inlet valve from its first state to its second state before the outlet valve is moved into its second state.

Advantageously, closing the inlet valve before causing the outlet valve to open prevents any diluent or liquid in the chamber from exiting the chamber through the inlet valve. This helps to ensure that the full amount of diluent in the fixed volume chamber can be dispensed through the outlet valve.

In some embodiments, the release element may be slidably received in an outlet aperture in the container and comprises a fluid conduit extending therethrough.

In some embodiments, the fluid conduit may comprise an inlet located in the release element such that when the release element is in its first state the inlet to the fluid conduit is located outside the chamber and when the release element is in its second state the inlet to the fluid conduit is located inside the chamber.

Advantageously, the flow of diluent can be controlled by the position of the release element such that fluid can only exit the apparatus when the release element is moved into the apparatus.

In some embodiments, the inlet to the fluid conduit may be located in a side wall of the release element.

Advantageously, the positioning of the fluid conduit in the side wall of the release element may ensure that all the diluent in the chamber may exit the apparatus. In addition, the positioning of the fluid conduit in the side wall allows the release element to remain in the aperture in the bottom wall of the container in the first state and the second state to maintain the structural integrity of the chamber.

In some embodiments, the fluid conduit may comprise an outlet that is in fluid communication with the outlet spike.

Thus, diluent delivered from the chamber of the apparatus may be directly dispensed into a vial.

In some embodiments, the stopper element may comprise a shaft received in a bore in the release element, and a head configured to abut a valve seat to close an inlet aperture in the container when the inlet valve is in its second state.

Advantageously, the head of the shaft can close the inlet to prevent further diluent entering the chamber during the dispensing step. This helps to ensure that the correct volume of diluent is dispensed.

In some embodiments, the shaft may be moveable within the bore in the release element.

Advantageously, the shaft moving relative to the release element allows for the inlet valve to be closed before the outlet valve is opened in order to fix the volume of liquid/diluent in the chamber and also allows for the outlet valve to be subsequently opened via movement of the release element.

In some embodiments, the valve mechanism may comprise a biasing member configured to bias the stopper element into a deployed position.

Advantageously, the biasing member may return the stopper element to its deployed position once the outlet valve has been closed. This enables the apparatus to be re-used.

In some embodiments, the inlet valve and outlet valve may be formed by check mechanisms.

In some embodiments, when the inlet valve is in its first state, the inlet valve disc may extend into the chamber and when the outlet valve is in its second state the outlet valve disc may extend away from the chamber.

Thus, the discs of the inlet and outlet check mechanisms can only be moved in one direction. This helps to prevent 'backflow' of diluent, i.e. this helps to prevent flow of fluid in the opposite direction.

In some embodiments, the outlet valve may have a larger crack pressure than the inlet valve.

Advantageously, the larger crack pressure of the outlet valve allows the chamber to fill with the required volume of diluent without opening. Thus, the correct volume can be stored in the chamber during use without leakage or accidently diluent delivery.

In some embodiments, the container may comprise a collapsible bellows.

In some embodiments, the collapsible bellows may be moveable from an extended state to a compressed state, in which fluid pressure within the chamber maintains the inlet valve in its second state and causes the outlet valve to change from its first state to its second state.

Advantageously, the diluent can be delivered by the force exerted by the user rather than relying on gravity. Thus, the diluent can be dispensed faster.

In some embodiments, the apparatus may further comprise a side port located between the inlet and the inlet valve, the side port being configured to allow replenishment of a storage container.

Thus, diluent can be added into a storage container, i.e. IV bag, without the need for removing the apparatus from the storage container.

In some embodiments, the inlet spike may be releasably attachable to the container.

Advantageously, chambers of different internal net volumes may be used to dispense different amounts of diluent.

It is a second object of the present disclosure to provide an advantageous method of filling a vial with a fixed volume of diluent from a storage container, the method comprising inserting an inlet spike of an apparatus into a port of a storage container storing diluent, filling a fixed volume chamber of the apparatus with diluent through an open inlet valve until the fixed volume chamber is full, inserting an outlet spike of the apparatus into a vial, moving the vial towards the apparatus to advance a valve mechanism into the chamber of the apparatus to close the inlet valve and open the outlet valve, and transferring the diluent from the chamber of the apparatus to the vial.

It is a third object of the present disclosure to provide an advantageous method of filling a vial with a fixed volume of diluent from a storage container, the method comprising inserting an inlet spike of an apparatus into a port of a storage container storing diluent such that the apparatus is below the storage container, filling a chamber of the apparatus with diluent through an open inlet valve until the chamber is full, inserting an outlet spike of the apparatus into a vial, inverting a kit comprising the vial, storage container, and apparatus, such that the vial is above the apparatus and the apparatus is above the storage container, compressing the collapsible bellows of the apparatus by moving the vial towards the storage container to close the inlet valve and open the outlet valve using hydrostatic pressure generated by compressing the bellows.

These and other aspects of the disclosure will be apparent from and elucidated with reference to the embodiments described hereinafter.

BRIEF DESCRIPTION OF THE FIGURES

Embodiments of the disclosure will now be described, by way of example only, with reference to the accompanying drawings, in which.

DETAILED DESCRIPTION

A drug delivery device, as described herein, may be configured to inject a medicament into a patient. For example, delivery could be sub-cutaneous, intra-muscular, or intravenous. Such a device could be operated by a patient or care-giver, such as a nurse or physician, and can include various types of safety syringe, pen-injector, or auto-injector. The device can include a cartridge-based system that requires piercing a sealed ampule before use. Volumes of medicament delivered with these various devices can range from about 0.5 ml to about 2 ml. Yet another device can include a large volume device ("LVD") or patch pump, configured to adhere to a patient's skin for a period of time (e.g., about 5, 15, 30, 60, or 120 minutes) to deliver a "large" volume of medicament (typically about 2 ml to about 10 ml).

In combination with a specific medicament, the presently described devices may also be customized in order to operate within required specifications. For example, the device may be customized to inject a medicament within a certain time period (e.g., about 3 to about 20 seconds for auto-injectors, and about 10 minutes to about 60 minutes for an LVD). Other specifications can include a low or minimal level of discomfort, or to certain conditions related to human factors, shelf-life, expiry, biocompatibility, environmental considerations, etc. Such variations can arise due to various factors, such as, for example, a drug ranging in viscosity from about 1 cP to about 50 cP. Consequently, a drug delivery device will often include a hollow needle ranging from about 25 to about 31 Gauge in size. Common sizes are 27 and 29 Gauge.

Figure 1:
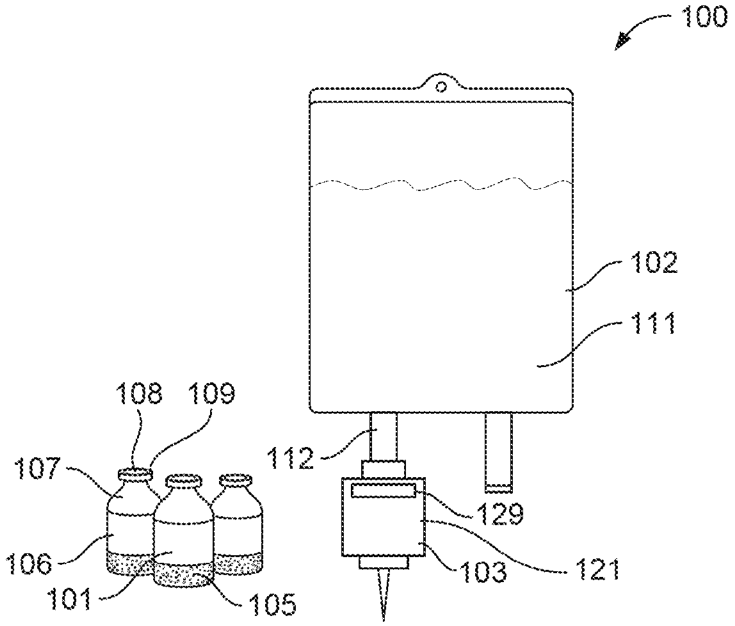
FIG. 1 shows a schematic view of a kit for filling a medicament preparation vial from a storage container using an apparatus.

Referring now to FIG. 1, a schematic view of a kit 100 for filling a medicament preparation vial 101 from a storage container 102 using an apparatus 103 of the present disclosure is shown. The kit 100 comprises at least one vial 101, the storage container 102, and the apparatus 103.

The at least one vial 101 may be configured to store a liquid or lyophilized medicament 105. The at least one vial 101 may have a generally cylindrical body 106 and a narrower or tapering neck 107. One end of the at least one vial 101 may comprise an aperture 108. The aperture 108 may be closed with a sealing membrane 109. The sealing membrane 109 may be a self-sealing membrane. The body 106 and neck 107 of the at least one vial 101 may be made from any suitable material, such as, for example but not limited to, borosilicate glass or plastic.

The storage container 102 may be configured to store a diluent 111. The diluent 111 may be for example, but not limited to, saline, dextrose, or another common commodity solution. The storage container 102 may be an IV bag, as shown in FIG. 1. The storage container 102 may comprise at least one port 112. The at least one port 112 may be configured to allow fluid to be introduced to the storage container 102 and or removed from the storage container 102. It will be appreciated that the storage container 102 may comprise more than one port 112. For example, the storage container 102 may comprise two ports 112, as shown in FIG. 1. In such an embodiments, one of the at least one port 112 may be used as an input port and the other of the at least one port 112 may be used as an outlet port 112.

Figure 2:
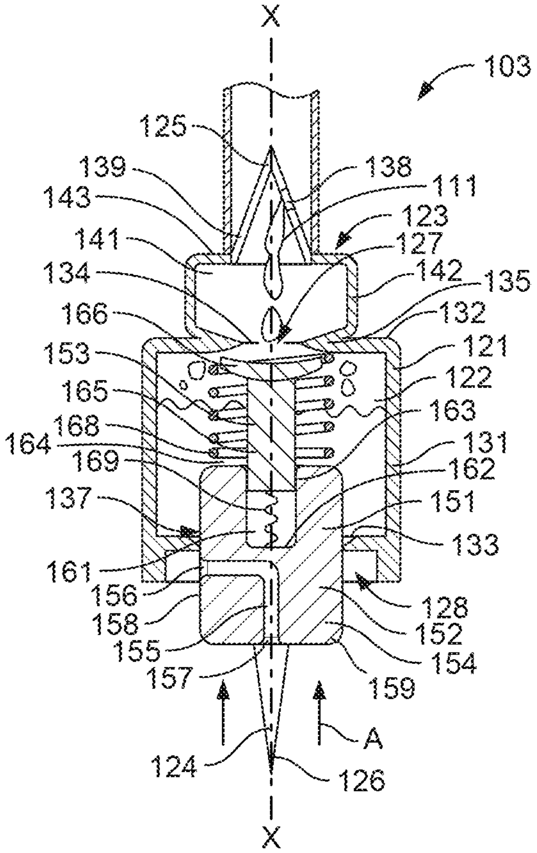
FIG. 2 shows a cross-sectional side view of the apparatus shown in FIG. 1.

Referring now to FIG. 2, a cross-sectional side view of the apparatus 103 for filling a medicament preparation vial 101 with a fixed volume of diluent from a storage container 102. One advantage of the apparatus 103 of the present disclosure is that it ensures that a fixed volume of diluent can be dispensed from the storage container 102 into the vial 101 without any determinations required from the user such as calculating the amount of diluent to be dispensed or performing difficult or precise processes to determine the amount of diluent removed from the storage container 102.

The apparatus 103 comprises a container 121. The container 121 defines a chamber 122. The chamber 122 is configured to receive a fixed volume of diluent. That is, the chamber 122 is configured to receive a fixed volume of diluent from the storage container 102. It will be appreciated that the chamber 122 may receive a different liquid such as a liquid medicament, an inert liquid vehicle of a suspension, or a suspension of a solid medicament form in an inert liquid vehicle.

The apparatus 103 further comprises an inlet 123 and an outlet 124. The inlet 123 comprises an inlet spike 125. The inlet spike 125 is configured to be removably insertable into a port 112 of the storage container 102. The outlet 124 comprises an outlet spike 126. The outlet spike 126 is configured to be removably insertable into a medicament preparation vial 101.

The apparatus 103 further comprises an inlet valve 127 and an outlet valve 128. The inlet valve 127 is located downstream of the inlet spike 125. The inlet valve 127 has a first state and a second state. In the first state the inlet valve 127 is configured to allow fluid communication between the inlet 123 and the chamber 122 In the second state, the inlet valve 127 is configured to prevent fluid communication between the inlet 123 and the chamber 122. The outlet valve 128 is located upstream of the outlet spike 126. The outlet valve 128 has a first state and a second state. In the first state the outlet valve 128 is configured to prevent fluid communication between the chamber 122 and the outlet 124. In the second state, the outlet valve 128 is configured to allow fluid communication between the chamber 122 and the outlet 124.

The outlet valve 128 is in its first state when the inlet valve 127 is in its first state. When the inlet valve 127 is in its second state, the outlet valve 128 is moveable from its first state to its second state.

That is, the outlet valve 128 may be closed when the inlet valve 127 is open. Furthermore, when the inlet valve 127 is closed, the outlet valve may be switched from its closed position to its open position.

In the present embodiment, the container 121 of the apparatus 103 may be generally cylindrical. The container 121 may be hollow such that the walls of the container 121 define a chamber 122 or reservoir therebetween. However, it will be appreciated that in an alternative embodiment, the container 121 and the chamber 122 defined therein may be of any other shape. The container 121 may be dimensioned such that the net internal volume of the chamber 122 corresponds to a common volume of diluent required to be combined with a liquid or lyophilised medicament. For example, the container 121 may be dimensioned such that the net internal volume of the chamber 122 is equal to for example, but not limited to, 1 ml, 2 ml, 5 ml, 10 ml, or 20 ml. In some embodiments, the container 121 may be dimensioned such that the net internal volume of the chamber 122 is equal to a specific fixed quantity of diluent, intended for use with one specific medicament (i.e., not a generic or common quantity). The net internal volume may be considered to be the volume within the container 121, i.e. the chamber 122, that can be filled by diluent. That is, the volume of the chamber 122 minus the volume of any components housed within the chamber 122, as will be described in more detail hereinafter.

In some embodiments, the container 121 may comprise a window 129, as indicated in FIG. 1. The window may allow a user to see inside the chamber 122 of the container 121 to determine whether the chamber 122 is full of diluent during use.

The chamber 122 may be defined between a circumferentially extending side wall 131 and top and bottom walls 132, 133. The circumferentially extending side wall 131 may extend about the longitudinal axis X of the apparatus 103. That is, the circumferentially extending side wall 131 may extend parallel to the longitudinal axis X. The side wall

131 may extend beyond the bottom wall 133 of the container 121. This may be desirable to obstruct user access to one or more surfaces of the outlet valve 128, thereby maintaining mechanical function, component cleanliness, and/or sterility. The inner diameter of the side wall 131 may be substantially equal to, but not smaller than, the outer diameter of a vial 101 to be used with the apparatus 103. Therefore, vial 101 and apparatus 103 may be more securely connected. The window 129 may be provided in the side wall 131 of the container 121. Alternatively, apparatus 103 may be formed of a substantially transparent material, thereby achieving the same effect as window 129.

The top wall 132 may comprise an aperture 134 therein. The aperture 134 may be located centrally in the top wall 132. The centre of the aperture 134 may be coincident with the central longitudinal axis X of the apparatus 103. The aperture 134 in the top wall 132 may form the inflow aperture for diluent into the chamber 122. The portion of the top wall 132 defining the edge of the aperture 134 may form an inlet valve seat 135. The top wall 132 may extend generally perpendicularly to the longitudinal axis X of the apparatus 103.

The bottom wall 133 may comprise an aperture 137 therein. The aperture 137 may be located centrally in the bottom wall 133. The centre of the aperture 137 may be coincident with the central longitudinal axis X of the apparatus 103. The aperture 137 in the bottom wall 133 may be configured to receive a valve mechanism 151 that forms a part of the inlet and outlet valves 127, 128, as will be explained in more detail hereinafter. The bottom wall 133 may extend generally perpendicularly to the longitudinal axis X of the apparatus 103, as illustrated in FIG. 2. However, it will be appreciated that in an alternative embodiment, the bottom wall 133 may be inclined towards the central longitudinal axis X of the apparatus 103 in a direction towards the outlet spike 126. This, advantageously, minimises dead volume within the chamber 122 and maximises that volume of diluent that exits the chamber 122 when the outlet valve 128 is moved into its second state.

In some embodiments, the outlet spike 126 may have an outer diameter that is substantially equal to, but not larger than, the inner diameter of the vial 101 to be used with the apparatus 103. Therefore, vial 101 and apparatus 103 may be more securely connected. In some embodiments, the distance between the outer surface of the outlet spike 126 and the inner surface of the side wall 131 may be substantially equal to the thickness of the circumferential wall of the opening of the vial 101. Therefore, vial 101 may be more securely received in the apparatus 103 to avoid spillage of liquid during use.

The container 121 may additionally define a pre-chamber 141. The pre-chamber 141 may be located upstream of the chamber 122. The pre-chamber 141 may be located on the opposite side of the aperture 134 in the top wall 132 to the chamber 122. The pre-chamber 141 may be smaller than the chamber 122. The pre-chamber 141 may have a circumferentially extending side wall 142 and a top wall 143, similar to the side wall 131 and top wall 132 previously described. The side wall 142 of the pre-chamber 141 may be located closer to the central longitudinal axis X of the apparatus 103 than the side wall 131. The top wall 132 defining the chamber 122 may also be the bottom wall of the pre-chamber 141. The top wall 143 of the pre-chamber 141 may have an opening 144 that fluidly connects the pre-chamber to the inlet spike 125. It will be appreciated in some embodiments that the inlet spike 125 may be directly connected to the top wall 132 of the chamber 122 and the pre-chamber 141 may be omitted.

The inlet spike 125 may be generally conical in shape. The inlet spike 125 may comprise an inlet aperture 138. The inlet aperture 138 may be in a side wall of the inlet spike 125. The wider end of the inlet spike 125 may be in fluid communication with the pre-chamber 141 or the aperture 134 in the top wall 132 of the chamber 122 of the container 121. The inlet spike 125 may comprise an attachment means 139 configured to attach the apparatus 103 to the port 112 of the storage container 102. In some embodiments, the attachment means 139 may be an interference fit. In some embodiments, the inlet spike 125 may be a needle.

In the embodiment illustrated in FIG. 2, the outlet spike 126 may be reversibly moveable. The outlet spike 126 may be reversibly moveable in a direction towards (as indicated by the upward facing arrows A) the inlet spike 125. That is, the outlet spike 126 may be translatable in a direction parallel to a longitudinal axis X of the apparatus 103. Movement of the outlet spike 126 in a direction towards the inlet spike 125 may cause the state of the outlet valve 128 to be changed from its first state to its second state.

As previously disclosed, the apparatus 103 may comprise a valve mechanism 151. The valve mechanism 151 may form at least a part of the inlet valve 127. The valve mechanism 151 may also form at least a part of the outlet valve 128. The valve mechanism 151 may be located within the aperture 137 of the bottom wall 133 of the container 121 defining the chamber 122.

The valve mechanism 151 may be movable between a first configuration, an intermediate configuration, and a second configuration. In the first configuration of the valve mechanism 151, the inlet valve 127 may be in its first state. That is, in the first configuration of the valve mechanism 151, the inlet valve 127 may be open such that the inlet spike 125 and the chamber 122 are in fluid communication. In the first configuration of the valve mechanism 151, the outlet valve 128 may be in its first state. That is, in the first configuration of the valve mechanism 151, the outlet valve 128 may be closed such that the outlet spike 126 is not in fluid communication with the chamber 122. Thus, in the first configuration of the valve mechanism 151, diluent may flow from the storage container 102 into the chamber 122. In the first configuration of the valve mechanism 151, diluent may not flow out of the chamber 122.

In the intermediate configuration of the valve mechanism 151, the inlet valve 127 may be in its second state. That is, in the intermediate configuration of the valve mechanism 151, the inlet valve 127 may be closed such that the inlet spike 125 is not in fluid communication with the chamber 122. In the intermediate configuration of the valve mechanism 151, the outlet valve 128 may be in its first state. That is, in the intermediate configuration of the valve mechanism 151, the outlet valve 128 may be closed such that the outlet spike 126 is not in fluid communication with the chamber 122. Thus, in the intermediate configuration of the valve mechanism 151, diluent may not flow into or out of the chamber 122.

In the second configuration of the valve mechanism 151, the inlet valve 127 may be in its second state. That is, in the second configuration of the valve mechanism 151, the inlet valve 127 may be closed such that the inlet spike 125 is not in fluid communication with the chamber 122. In the second configuration of the valve mechanism 151, the outlet valve 128 may be in its second state. That is, in the second configuration of the valve mechanism, the outlet valve 128, may be open such that the chamber 122 is in fluid communication with the outlet spike 126. Thus, in the second configuration of the valve mechanism 151, diluent may flow out of the chamber 122 into a vial 101. In the second configuration of the valve mechanism 151, diluent may not flow into the chamber 122.

The valve mechanism 151 may be sealingly disposed within the aperture 137 such that diluent cannot pass between the bottom wall 133 and the valve mechanism 151. In some embodiments, the periphery of the aperture 137 defined by the bottom wall 133 may comprise an o-ring (not shown) to seal any gap between the bottom wall 133 and the valve mechanism 151. It will be appreciated that any other appropriate sealing means could be utilised.

The valve mechanism 151 may comprise a release element 152. The release element 152 may be configured to control fluid flow out of the chamber 122. The valve mechanism 151 may comprise a stopper element 153. The stopper element 153 may be configured to control fluid flow into the chamber 122. Therefore, the release element 152 may form at least a part of the outlet valve 128 and the stopper element 153 may form at least a part of the inlet valve 127.

The valve mechanism 151 may be configured to move the inlet valve 127 from its first state to its second state before the outlet valve 128 is moved into its second state. The valve mechanism 151 may be configured to move longitudinally with respect to the container 121 in a direction parallel to the longitudinal axis X of the apparatus 103. Therefore, the valve mechanism 151 may contact the inlet valve seat 135 to close the inlet valve 127 before the outlet valve 128 is opened. Consequently, the amount of diluent in the chamber 122 of the container 121 is fixed before the diluent is dispensed. As a result, the volume of diluent dispensed is always equal to the volume of the chamber, which improves accuracy of the volume of diluent dispensed.

The release element 152 may be in contact with the bottom wall 133 of the container 121 that forms the periphery of the aperture 137 in the bottom wall 133. In some embodiments, the release element 152 may be in contact with the o-ring located in the bottom wall 133 on the periphery of the aperture 137. The release element 152 may be in contact with the container 121 so as to seal any gap to prevent fluid movement therethrough.

The release element 152 may comprise a main body 154. The main body 154 may have a cross-section in a plane that extends perpendicularly to the longitudinal axis X of the apparatus 103 that is substantially the same as the cross-section of the aperture 137. The outlet spike 126 may be attached to the release element 152.

The release element 152 may be slidably received in the outlet aperture 137 in the container 121. That is, the release element 152 may be moveable in the longitudinal direction through the outlet aperture 137 with respect to the container 121. The release element 152 may be moveable between an extended position, shown in FIG. 2, and a retracted position in which the release element 152 is longitudinally closer to the inlet spike 125 of the apparatus 103.

The longitudinal movement of the release element 152 may be limited such that at least a portion of the release element 152 is always located outside of the chamber 122 of the container 121 or at least in contact with the bottom wall 133 or sealing mechanism therein. The longitudinal movement of the release element 152 may also be limited such that at least a portion of the release element 152 is always located within the chamber 122 of the container 121. That is, a portion of the release element 152 may always be located in the aperture 137 in the bottom wall 133 of the container 121. In some embodiments, the release element 152 may have an outer diameter that is substantially equal to, but not larger than, the inner diameter of the vial 101 to be used with the apparatus 103.

The release element 152 may comprise a fluid conduit 155 extending therethrough. The fluid conduit 155 may be configured to allow fluid communication of the chamber 122 with the outlet spike 126 when the outlet valve 128 is in its second state. That is, the fluid conduit 155 may be configured to allow fluid communication of the chamber 122 with the outlet spike 126 when the release element 152 is moved into its retracted position.

The fluid conduit 155 may comprise an inlet 156 and an outlet 157. The inlet 156 to the fluid conduit 155 may be located in the release element 152 such that when the release element 152 is in its first state, the inlet 156 to the fluid conduit 155 is outside the chamber 122, as shown in FIG. 2. That is, the inlet 156 to the fluid conduit 155 may be located in the release element 152 such that when the release element 152 is in its first state, the inlet 156 is not in fluid communication with the chamber 122 inside the container 121. Furthermore, the inlet 156 to the fluid conduit 155 may be located in the release element 152 such that when the release element 152 is in its second state, the inlet 156 to the fluid conduit 155 is inside the chamber 122. That is, the inlet 156 to the fluid conduit 155 may be located in the release element 152 such that when the release element 152 is in its second state, the inlet 156 is in fluid communication with the chamber 122 inside the container 121.

The inlet 156 of the fluid conduit 155 may be located in a side surface 158 of the release element 152. As shown in FIG. 2, the inlet 156 of the fluid conduit 155 may be located in an outermost side surface 158 of the release element 152. The outlet 157 of the fluid conduit 155 may be located such that it is in fluid communication with the outlet spike 126. The outlet 157 of the fluid conduit 155 may be located in a surface 159 that is permanently located outside of the chamber 122 of the container 121, i.e. when the valve mechanism 151 is in the first, intermediate, or second configuration. The surface 159 in which the outlet 157 of the fluid conduit 155 is located may be a bottom surface of the release element 152 of the valve mechanism 151 of the apparatus 103.

In the embodiment illustrated in FIG. 2, the fluid conduit 155 forms an 'L' shape. However, in an alternative embodiment, the fluid conduit 155 may take a different form, such as an inclined slope with a constant gradient.

The release element 152 may further comprise a bore 161. The bore 161 may be located coincidently with the longitudinal axis X of the apparatus 103. The bore 161 may be generally cylindrical. The bore 161 may extend into the main body 154 of the release element 152. The bore 161 may have a closed end 162 and an opposing open end 163. The open end 163 of the bore 161 may be located in a surface 164 of the main body 154 of the release element 152. The surface 164 of the main body 154 of the release element 152 in which the open end 163 of the bore 161 is located may be the top surface of the release element 152.

The stopper element 153 may comprise a shaft 165 and a head 166. The shaft 165 may be configured to be received in the bore 161 of the release element 152. The shaft 165 may be generally cylindrical. However, it will be appreciated that in other embodiment, the shaft 165 may be any shape. The shaft 165 of the stopper element 153 may extend parallel to the longitudinal axis X of the apparatus 103. The head 166 of the stopper element 153 may be configured to abut the valve seat 135 to close the inlet aperture 138 when the inlet valve 127 is in its second state. The head 166 of the stopper element 153 may be spaced from the valve seat 135 when the inlet valve 127 is in its first state.

The head 166 of the stopper element 153 may have a similar cross-section shape in a plane extending perpendicularly to the longitudinal axis X of the apparatus 103 to the inlet aperture 138 to the chamber 122 in the container 121. However, the head 166 of the stopper element 153 may have a larger cross-sectional area than the aperture 138 to ensure that the head 166 of the stopper element 153 contacts the valve seat 135 when the inlet valve 127 is in its second state. The head 166 of the stopper element 153 may be a generally cylindrical disc. The head 166 of the stopper element 153 may have a greater diameter than the shaft 165 of the stopper element 153.

The stopper element 153 may be slidably received in the release element 152. More specifically, the shaft 165 of the stopper element 153 may be slidably received in the bore 161 of the release element 152. Thus, the stopper element 153 may be moveable within the bore 161 of the release element and moveable relative to the release element 152. The movement of the shaft 165 of the stopper element 153 within the bore 161 of the release element 152 may be limited such that a portion of the shaft 165 of the stopper element 153 is always located in the bore 161 of the release element 152.

The stopper element 153 may be moveable between a deployed position, shown in FIG. 2, and a compressed position. In the deployed position, the head 166 of the stopper element 153 is located at its maximum distance from the release element 152. In the compressed position, the shaft 165 of the stopper element 153 extends further into the bore 161 of the release element 152 such that the head 166 of the stopper element 153 is closer to the release element 152 in the deployed position shown in FIG. 2. In some embodiments, a free end of the shaft 167 may contact the closed end of the bore 161 in the release element 152 when the stopper element 153 is in its compressed position.

The stopper element 153 may be in its deployed position when the valve mechanism 151 is in its first configuration. That is, the stopper element 153 may be in its deployed position when the release element is in its extended position. The stopper element 153 may be in its deployed position when the valve mechanism 151 is in its intermediate configuration at the immediate moment that the inlet valve 127 is switched from its first state to its second state. The stopper element 153 may be in its compressed position when the valve mechanism 151 is in its second position. That is, the stopper element may be in its compressed position when the release element is in its retracted position.

In some embodiments, the valve mechanism 151 may further comprise a release element biasing member 168. The release element biasing member 168 may be configured to bias the release element 152 into its extended position. This allows the outlet valve 128 to be returned to its first state, i.e. closed, when the external force pushing a vial 101 against the release element 152 is removed. The release element biasing member 168 may extend from the top wall 132 of the container 121 to the top surface 164 of the release element 152.

In some embodiments, the valve mechanism 151 may further comprise a stopper element biasing member 169. The stopper element biasing member 169 may be configured to bias the stopper element 153 into its deployed position. Thus, the biasing member 169 may be able to return the stopper element 153 to its deployed position when the release element 152 is returned to its extended position. The stopper element biasing member 169 may extend from the closed end of the bore 161 to either the free end of the shaft 165 or the head 166 of the stopper element 153.

A method of filing a vial 101 with a fixed volume of diluent from a storage container 102 will now be described with reference to FIG. 2. The method comprises the steps of inserting an inlet spike 125 of an apparatus 103 into a port 112 of a storage container 102 storing a diluent such that the apparatus 103 is below the storage container 102 and filling a fixed volume chamber 122 of the apparatus 103 with diluent through an open inlet valve 127 until the fixed volume chamber 122 is full.

The method further comprises the steps of inserting an outlet spike 126 of the apparatus 103 into a vial 101, and moving the vial 101 towards the apparatus 103 to advance a valve mechanism 151 into the chamber 122 of the apparatus 103 to close the inlet valve 127 and open the outlet valve 128, and transfer the diluent from the chamber 122 of the apparatus 103 to the vial 101.

The apparatus 103 is provided in its first configuration. That is, the release element 152 is in its extended position and the stopper element 153 is in its deployed position. Thus, the inlet valve 127 is in its first state, i.e. open, and the outlet valve 128 is in its first state, i.e. closed.

A narrow end of the inlet spike 125 of the apparatus 103 may be inserted into the port 112 of a storage container 102. Insertion of the apparatus 103 into the port 112 of the storage container 102 may take place whilst the valve mechanism 151 is in its first configuration. The inlet spike 125 may be inserted into the port 112 until the attachment means 139 is engaged. The storage container 102 may be positioned at a greater vertical height than the apparatus 103 so that the diluent contained therein flow downwards. The diluent may flow from the port 112 through the inlet aperture 138 of the inlet spike 125.

As the valve mechanism 151 is in its first configuration, the diluent may flow into the chamber 122 of the container 121 until the chamber 122 is full. In some embodiments, the diluent may flow into the chamber 122 of the container 121 via the pre-chamber 141.

Once the chamber 122 is full, a user may take a vial 101 and move the vial 101 such that the outlet spike 126 is inserted into the vial 101. In some embodiments, the insertion of the outlet spike 126 into the vial 101 may cause the outlet spike 126 to pierce a sealing membrane 109 covering the aperture 108 of the vial 101. The vial 101 may be moved toward the container 121 of the apparatus 103 until the vial 101 contacts the bottom surface 159 of the valve mechanism 151.

The vial 101 may then be pushed against the bottom surface 159 of the release element 152. When the user overcomes the biasing force of the release element biasing member 168, the release element biasing member 168 may begin to compress and the release element 152 may be moved longitudinally further into the chamber 122 of the container 121. The valve mechanism 151 continues to move towards the inlet 123 as one until the head 166 of the stopper element 153 contacts the valve seat 135 of the aperture 134 in the top wall 132 in the chamber 122 of the container 121.

In this position, the inlet valve 127 may be moved from its first state, i.e. open, to its second state, i.e. closed. Furthermore, the inlet 156 of the fluid conduit 155 may remain outside the chamber 122 of the container 121 such that the fluid conduit 155 is not fluid communication with the chamber 122. Thus, the valve mechanism 151 is moved into its intermediate configuration. Thus, no more diluent can enter into the chamber 122 through the inlet valve 127 and no diluent can exit the chamber 122 through the outlet valve 128.

The vial 101 may be further moved towards the inlet 123 against the biasing force of the release element biasing means 168 and the stopper element biasing means 169 until the inlet 156 of the fluid conduit 155 is moved into the chamber 122. Thus, the valve mechanism 151 may be moved into its second configuration. With the inlet 156 of the fluid conduit 155 in the chamber 122, the outlet valve 128 is moved from its first state, i.e. closed, to its second state, i.e. open. Thus, the chamber 122 may be in fluid communication with the outlet 124 of the apparatus 103 and the diluent may be transferred from the chamber 122 of the apparatus 103 into the vial 101.

The vial 101 may then be moved away from the apparatus 103 and the valve mechanism 151 is returned to its first configuration under the force of the biasing members 168, 169 when the external forces are removed from the release element 152.

Figure 3:
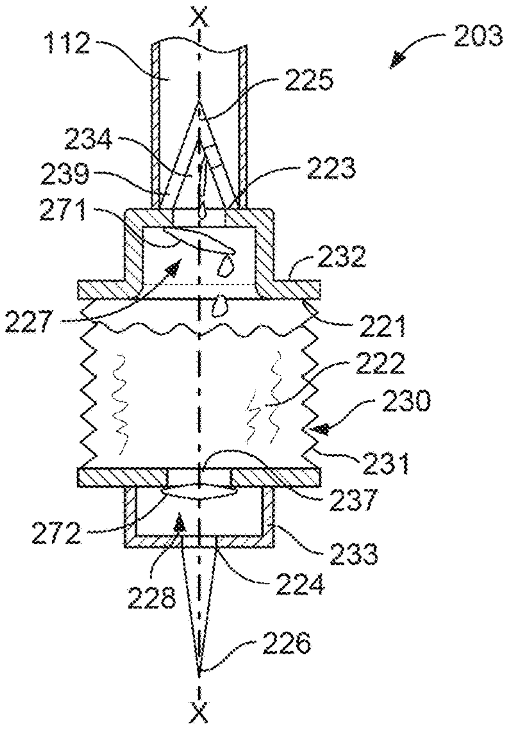
FIG. 3 shows a cross-sectional side view of a different apparatus during a filling stage.
Figure 4:
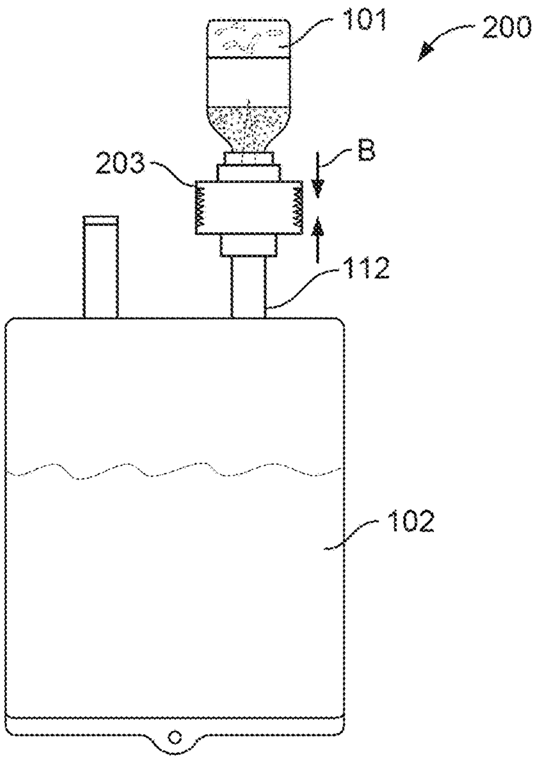
FIG. 4 shows a schematic side view of a kit for filling a medicament preparation vial using the apparatus of FIG. 3 in a dispensing stage.
Figure 5:
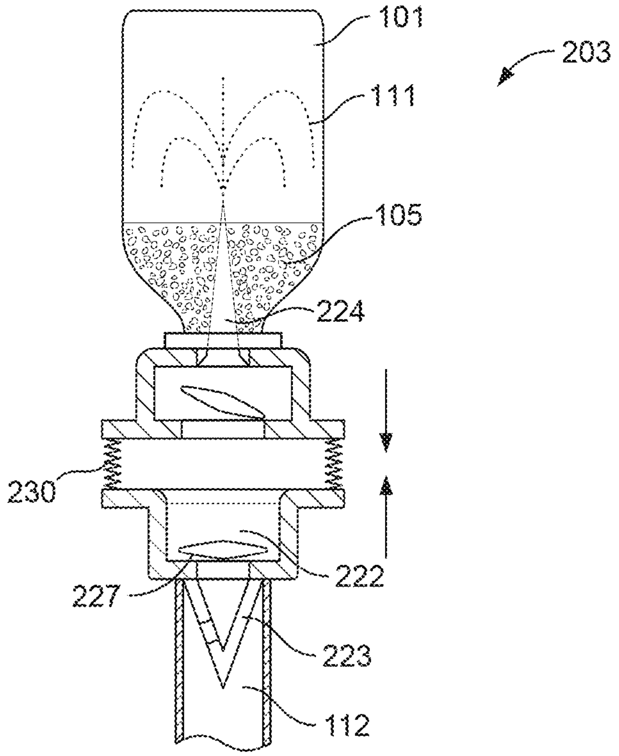
FIG. 5 shows an enlarged cross-sectional side view of the apparatus shown in FIG. 3.

Referring now to FIGS. 3 to 5, another embodiment of an apparatus 203 for filing a medicament preparation vial 101 with a fixed volume of diluent from a storage container 102 and a kit 200 for filling a medicament preparation vial 101 from a storage container 102 using the apparatus 203 is shown. The apparatus 203 illustrated in FIGS. 3 to 5 is generally the same as the apparatus 103 previously described with reference to FIGS. 1 and 2. Therefore, a detail description of the apparatus 203 will be omitted herein for the sake of brevity. Furthermore, similar features and components of the embodiment of the apparatus 203 will retain the same terminology and similar reference numerals.

Referring to FIG. 3, a schematic cross-sectional side view of the apparatus 203 is shown. The apparatus 203 comprises a container 221. The container 221 defines a chamber 222. The chamber 222 is configured to receive a fixed volume of diluent. That is, the chamber 222 is configured to receive a fixed volume of diluent from the storage container 102.

The apparatus 203 further comprises an inlet 223 and an outlet 224. The inlet 223 comprises an inlet spike 225. In some embodiments, the inlet spike 225 may be configured to be removably insertable into a port 112 of the storage container 102. In some embodiments, the inlet spike 225 may be configured to be irreversibly (i.e., permanently) insertable into a port 112 of the storage container 102. The outlet 224 comprises an outlet spike 226. The outlet spike 226 is configured to be removeable insertable into a medicament preparation vial 101.

The apparatus 203 further comprises an inlet valve 227 and an outlet valve 228. The inlet valve 227 is located downstream of the inlet spike 225. The inlet valve 227 has a first state and a second state. In the first state the inlet valve 227 is configured to allow fluid communication between the inlet 223 and the chamber 222 In the second state, the inlet valve 227 is configured to prevent fluid communication between the inlet 223 and the chamber 222. The outlet valve 228 is located upstream of the outlet spike 226. The outlet valve 228 has a first state and a second state. In the first state the outlet valve 228 is configured to prevent fluid communication between the chamber 222 and the outlet 224. In the second state, the outlet valve 228 is configured to allow fluid communication between the chamber 222 and the outlet 224.

The outlet valve 228 is in its first state when the inlet valve 227 is in its first state. When the inlet valve 227 is in its second state, the outlet valve 228 is moveable from its first state to its second state.

That is, the outlet valve 228 may be closed when the inlet valve 227 is open. Furthermore, when the inlet valve 227 is closed, the outlet valve may be switched from its closed position to its open position.

In the present embodiment, the container 221 of the apparatus 203 may be generally cylindrical. The container 221 may be hollow such that the walls of the container 221 define a chamber 222 or reservoir therebetween. However, it will be appreciated that in an alternative embodiment, the container 221 and the chamber 222 defined therein may be of any other shape. The container 221 may be dimensioned such that the net internal volume of the chamber 222 corresponds to a common volume of diluent required to be combined with a liquid or lyophilised medicament. For example, the container 221 may be dimensioned such that the net internal volume of the chamber 222 is equal to for example, but not limited to, 1 ml, 2 ml, 5 ml, 10 ml, or 20 ml. The net internal volume may be considered to be the maximum volume within the container 221, i.e. the chamber 222, that can be filled by diluent.

In some embodiments, the container 221 may comprise a window (not shown). The window may allow a user to see inside the chamber 222 of the container 221 to determine whether the chamber 222 is full of diluent during use.

The container 221 may comprise a collapsible bellows 230. That is, chamber 222 may be partially defined by a side wall 231. The side wall 231 may be formed by the collapsible bellows 230. The chamber 222 may further be defined between the circumferentially extending collapsible bellows 230 and top and bottom walls 232, 233. The circumferentially extending bellows 230 may extend about the longitudinal axis X of the apparatus 203, as previously described.

The collapsible bellows 230 that form the side wall 231 may be moveable between an extended state and a compressed state. Thus, the outlet spike 226 may be reversibly moveable in a direction towards the inlet spike 225. That is, the outlet spike 226 may be translatable in a direction parallel to a longitudinal axis X of the apparatus 203. FIG. 3 shows the collapsible bellows 230 in the extended state. The collapsible bellows 230 are shown in jagged lines to indicate that the side wall 231 can be folded upon itself, i.e. concertinaed, in order to move between the extended state and the compressed state.

When the collapsible bellows 230 is in its extended state, the inlet valve 227 may be in its first state, i.e. open, and the outlet valve 228 may be in its first state, i.e. closed, as shown in FIG. 3. When the collapsible bellows 230 is in its compressed state, fluid pressure within the chamber 222 may close and maintain the inlet valve 227 in its second state, i.e. closed, and cause the outlet valve 228 to change from its first state, i.e. closed, to its second state, i.e. open, as will be described in further detail hereinafter. Thus, movement of the outlet spike 226 is a direction towards the inlet spike 225 may cause the state of the outlet valve 228 to be changed from its first state, i.e. closed, to its second state, i.e. open.

The top wall 232 may comprise an aperture 234 therein. The aperture 234 may be located centrally in the top wall 232. The centre of the aperture 234 may be coincident with the central longitudinal axis X of the apparatus 203. The aperture 234 in the top wall 232 may form the inflow aperture for diluent into the chamber 222. The top wall 232 may extend generally perpendicularly to the longitudinal axis X of the apparatus 203.

The bottom wall 233 may comprise an aperture 237 therein. The aperture 237 may be located centrally in the bottom wall 233. The centre of the aperture 237 may be coincident with the central longitudinal axis X of the apparatus 203. The bottom wall 233 may extend generally perpendicularly to the longitudinal axis X of the apparatus 203, as illustrated in FIG. 3.

The inlet valve 227 and the outlet valve 228 may be formed by check mechanisms. That is, the inlet valve 227 and the outlet valve 228 may be formed by one-way valves. The inlet valve 227 may be configured to only allow diluent to enter the chamber 222. The outlet valve 228 may be configured to only allow diluent to exit the chamber 222.

The inlet valve 227 may comprise an inlet valve disc 271. The inlet valve disc 271 may be hinged to one side of the aperture 234 of the top wall 232 of the chamber 222. The inlet valve disc 271 may have a similar but larger cross-sectional area than the aperture 234, so that the aperture 234 is completely covered by the inlet valve disc 271 when the inlet valve 227 is in its second state, i.e. closed, as shown in FIG. 5. When the inlet valve 227 is in its first state, i.e. open, the inlet valve disc 271 may extend into the chamber 222, as shown in FIG. 3. Therefore, chamber 222 may be in fluid communication with the inlet 223 and diluent may flow into the chamber 222 from the storage container 102.

The outlet valve 228 may comprise an outlet valve disc 272. The outlet valve disc 272 may be hinged to one side of the aperture 237 of the bottom wall 233 of the chamber 222. The outlet valve disc 272 may have a similar but larger cross-sectional area than the aperture 237, so that the aperture 237 is completely covered by the outlet valve disc 272 when the outlet valve 228 is in its first state, i.e. closed, as shown in FIG. 3. When the outlet valve 228 is in its second state, i.e. open, the outlet valve disc 272 may away from the chamber 222, as shown in FIG. 5. Therefore, chamber 222 may be in fluid communication with the outlet 224 and diluent may flow from the chamber 222 into the vial 101 upon movement of the outlet spike 226 towards the inlet spike 225 and movement of the collapsible bellows 230 from its extended state, shown in FIG. 3, to its compressed state, shown in FIG. 5.

The outlet valve 228 may have a larger crack pressure than the inlet valve 227. Therefore, the outlet valve 228 is able to withstand the weight of the diluent entering the chamber 22 without opening. As a result, only an externally applied force from the user can cause the diluent to be dispensed from the chamber 222.

A method of filing a vial 101 with a fixed volume of diluent from a storage container 102 will now be described with reference to FIGS. 3 to 5. The method comprises the steps of inserting an inlet spike 125 of an apparatus 203 into a port 112 of a storage container 102 storing diluent such that the apparatus 203 is below the storage container 102, and filling a chamber 222 of the apparatus 203 with diluent through an open inlet valve 227 until the chamber 222 is full.

The method further comprises the steps of inserting an outlet spike 226 of the apparatus 203 into a vial 101, and inverting the kit 200 such that the vial 101 is above the apparatus 203 and the apparatus 203 is above the storage container 102. The method further comprises compressing the collapsible bellows 230 of the apparatus 203 by moving the vial 101 towards the storage container 102 to close the inlet valve 227 and open the outlet valve 228 using hydrostatic pressure generated by compressing the bellows 230.

The apparatus 203 may be provided with the collapsible bellows 230 in its extended state. Alternatively, the apparatus 203 may be provided with the collapsible bellows 230 in its compressed state and the user may move the collapsible bellows 230 into its extended state by moving the outlet 224 away from the inlet 223. The outlet valve 228 may be in its first state, i.e. closed. The inlet valve 227 may be in its second state, i.e. closed.

A narrow end of the inlet spike 225 of the apparatus 203 may be inserted into the port 112 of a storage container 102, as shown in FIG. 3. The inlet spike 225 may be inserted into the port 112 until the attachment means 239 is engaged. The storage container 102 may be positioned at a greater vertical height than the apparatus 203 so that the diluent contained therein can flow downwards. The diluent may flow from the port 112 through the inlet aperture 238 of the inlet spike 225.

Due to the crack pressure of the inlet valve 227, the inlet valve 227 may move from its second state, i.e. closed, to its first state, i.e. open, to allow diluent to flow from the inlet spike 225 into the chamber 222 of the container 221. Due to the higher crack pressure of the outlet valve 228, the outlet valve 228 may remain in its first state, i.e. closed. Thus, diluent is prevented from flowing out of the chamber 222. Therefore, the chamber 222 fills with a fixed volume of diluent.

The crack pressure of the outlet valve 228 may be able to withstand the pressure of the fixed volume of diluent acting thereupon.

Referring to FIG. 4, the kit 200 in the inverted such that the vial 101 is above the apparatus 203. Referring now to FIG. 5, the hydrostatic pressure of the diluent moves the inlet valve 227 into its second state, i.e. closed. The chamber 222 is thus prevented from fluid communication with the inlet 223 and the storage container 102 so that diluent cannot flow back into the storage container 102.

A user applies a force on the outlet end of the apparatus 203 or the vial 101 to move the outlet 224 towards the inlet 223, as shown by arrows B. The collapsible bellows 230 is moved from its extended state towards its compressed state. The hydrostatic pressure of the diluent over comes the crack pressure of the outlet valve 228 and causes the outlet valve 228 to move from its first state, i.e. closed, to its second state, i.e. open. Thus, the chamber 222 is in fluid communication with the outlet 224 and the vial 101. Therefore, diluent can flow from the chamber 222 into the vial 101.

Figure 6:
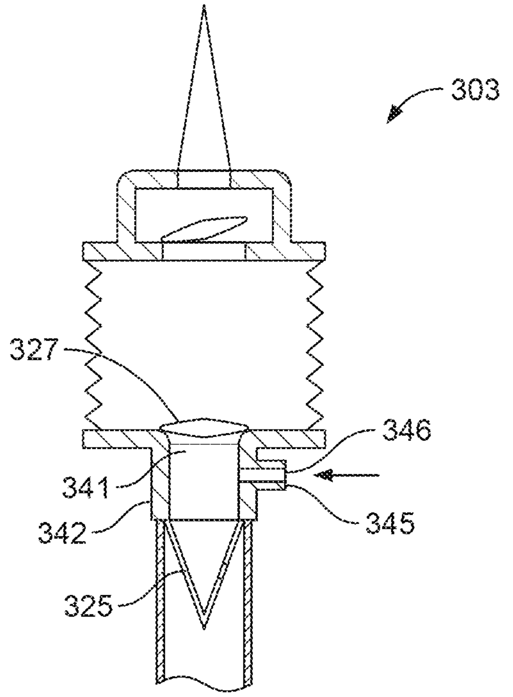
FIG. 6 shows an enlarged cross-sectional side view of an apparatus.
Figure 7:
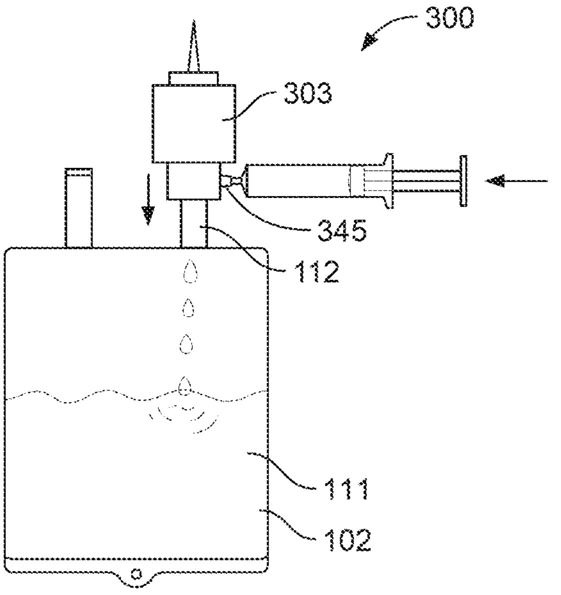
FIG. 7 shows a schematic side view of a kit for filling a medicament preparation vial using the apparatus shown in FIG. 6.

Referring now to FIGS. 6 and 7, another embodiment of an apparatus 303 for filling a medicament preparation vial 101 with a fixed volume of diluent from a storage container 102 and a kit 300 for filling a medicament preparation vial 101 from a storage container 102 using the apparatus 303 is shown. The apparatus 303 illustrated in FIG. 6 is generally the same as the apparatus 203 previously described with reference to FIGS. 3 to 5. Therefore, a detailed description of the apparatus 303 will be omitted herein for the sake of brevity. Furthermore, similar features and components of the embodiment of the apparatus 303 will retain the same terminology and similar reference numerals. A difference between the apparatus 303 of the present embodiment and the apparatus 203 of FIGS. 3 to 5 is the inclusion of an additional port, which will be described in more detail hereinafter.

The apparatus 303 comprises a pre-chamber 341. The pre-chamber 341 may be located between the inlet valve 327 and the inlet spike 325. The pre-chamber 341 may allow fluid communication between the inlet valve 327 and the inlet spike 325. The pre-chamber 341 may comprise a port 345. The port 345 may be located in a side wall 342 of the pre-chamber 341, and may be referred to as a side port 345. The side port 345 may be configured to allow replenishment of the storage container 102. The side port 345 may be configured to allow replenishment of the storage container 102 without removal of the apparatus 303 from the port 112 of the storage container 102. Location of the side port 345 upstream of the inlet valve 327 allows the user to by-pass the one-way inlet valve 327. The side port 345 may comprise a connection means 346 to allow a needle or syringe to be attached thereto, as shown in FIG. 7. The connection means 346 may be a Luer lock or any suitable connection means.

Figure 8:
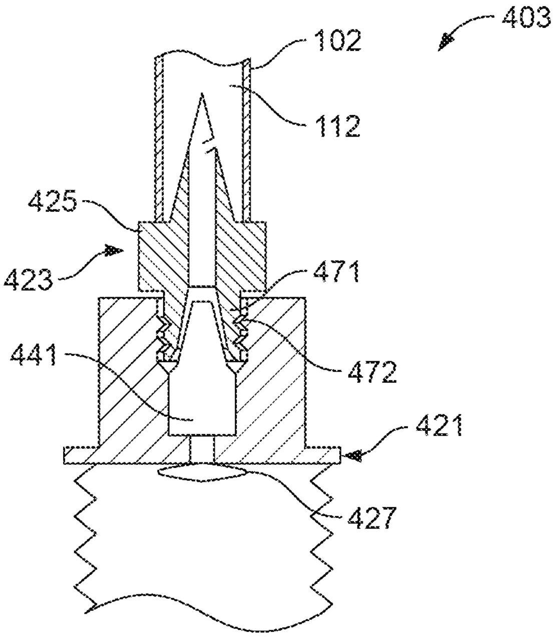
FIG. 8 shows an enlarged cross-sectional side view of an apparatus.

Referring now to FIG. 8, another embodiment of an apparatus 403 for filling a medicament preparation vial 101 with a fixed volume of diluent from a storage container 102 is shown. The apparatus 403 illustrated in FIG. 8 is generally the same as the apparatus 203, 303 previously described with reference to FIGS. 3 and 7. Therefore, a detail description of the apparatus 403 will be omitted herein for the sake of brevity. Furthermore, similar features and components of the embodiment of the apparatus 403 will retain the same terminology and similar reference numerals. A difference between the apparatus 403 of the present embodiment and the apparatus 203, 303 of FIGS. 3 to 7 is the construction of the inlet 423, as will be explained in more detail hereinafter.

In the present embodiment, the inlet spike 425 of the inlet 423 may be releasably attachable to the container 421 of the apparatus 403. As shown in FIG. 8, the container 421 may comprise a pre-chamber 441 located upstream of the inlet valve 427. The pre-chamber 441 may comprise a connection means 471 located at its upstream end that is configured to cooperate with a connection means 472 located on the downstream end of the inlet spike 425. The connection means 471, 472 may be, for example, but not limited to, a threaded connection or a snap fit connection or a Luer lock.

Thus, the apparatus 403 may be removed from the storage container 102 whilst the inlet spike 425 may remain connected to the port 112 of the storage container 102. As a result, the inlet spike 425 may be reusable. Thus, an apparatus 403 comprising a chamber 422 of a different volume may be used with the same inlet spike 425. The inlet spike 425 may be closed with a cap (not shown) when no diluent needs to be removed from the storage container 102.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about-4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. In some examples, the drugs or medicaments contained in the apparatus or systems as described herein may be used in enzyme replacement therapies or with oncology agents. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g., a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly (A21), Arg (B31), Arg (B32) human insulin (insulin glargine); Lys (B3), Glu (B29) human insulin (insulin glulisine); Lys (B28), Pro (B29) human insulin (insulin lispro); Asp (B28) human insulin (insulin aspart); human insulin, wherein proline in position B28 is replaced by Asp, Lys, Leu, Val or Ala and wherein in position B29 Lys may be replaced by Pro; Ala (B26) human insulin; Des (B28-B30) human insulin; Des (B27) human insulin and Des (B30) human insulin.

Examples of insulin derivatives are, for example, B29-N-myristoyl-des (B30) human insulin, Lys (B29) (N-tetradecanoyl)-des (B30) human insulin (insulin detemir, Levemir®); B29-N-palmitoyl-des (B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N-(N-palmitoyl-gamma-glutamyl)-des (B30) human insulin, B29-N-omega-carboxypentadecanoyl-gamma-L-glutamyl-des (B30) human insulin (insulin degludec, Tresiba®); B29-N-(N-lithocholyl-gamma-glutamyl)-des (B30) human insulin; B29-N-(ω-carboxyheptadecanoyl)-des (B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091 MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrome.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin.

Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a poly-sulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F (ab) and F(ab') 2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab') 2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, nanobodies, small modular immunopharmaceuticals (SMIP), binding-domain immunoglobulin fusion proteins, camelized antibodies, and VHH containing antibodies. Additional examples of antigen-binding antibody fragments are known in the art.

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen. Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014 (E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014 (E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014 (E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

Those of skill in the art will understand that modifications (additions and/or removals) of various components of the substances, formulations, apparatuses, methods, systems and embodiments described herein may be made without departing from the full scope and spirit of the present invention, which encompass such modifications and any and all equivalents thereof.

LIST OF REFERENCE NUMERALS

100 Kit
101 Vial
102 Storage Container
103 Apparatus
105 Medicament
106 Body
107 Neck
108 Aperture
109 Sealing Membrane
111 Diluent
112 Port
121 Container
122 Chamber
123 Inlet
124 Outlet
125 Inlet Spike
126 Outlet Spike
127 Inlet Valve
128 Outlet Valve
131 Side Wall
132 Top Wall
133 Bottom Wall
134 Aperture
135 Inlet Valve Seat
137 Aperture
138 Inlet Aperture
139 Attachment Means
141 Pre-chamber
142 Side Wall
143 Top Wall
151 Valve Mechanism
152 Release Element
153 Stopper Element
154 Main Body
155 Fluid Conduit
156 Inlet
157 Outlet
158 Side Surface
159 Bottom Surface
161 Bore
162 Closed End
163 Open End
164 Top Surface
165 Shaft
166 Head
167 Free End
168 Release Element Biasing Member
169 Stopper Element Biasing Member
200 Kit
203 Apparatus
221 Container
222 Chamber
223 Inlet
224 Outlet
225 Inlet Spike
226 Outlet Spike
227 Inlet Valve
228 Outlet Valve
230 Collapsible Bellows
231 Side Wall
232 Top Wall
233 Bottom Wall
234 Aperture
237 Aperture
238 Inlet Aperture
239 Attachment Means
271 Inlet Valve Disc
272 Outlet Valve Disc
300 Kit
303 Apparatus
325 Inlet Spike
327 Inlet Valve
328 Outlet Valve
341 Pre-Chamber
342 Sde Wall
345 Port
346 Connection Means
403 Apparatus
42 Container
422 Chamber
423 Inlet
425 Inlet Spike
427 Inlet Valve
441 Pre-Chamber
47 Connection Means
472 Connection Means

The invention claimed is:

1. An apparatus for filling a medicament preparation vial with a fixed volume of diluent from a storage container, the apparatus comprising:

a container defining a chamber configured to receive the fixed volume of diluent;

an inlet comprising an inlet spike configured to be removably insertable into a port of the storage container;

an outlet comprising an outlet spike configured to be removably insertable into the medicament preparation vial;

an inlet valve located downstream of the inlet spike, the inlet valve having a first state in which the inlet valve allows fluid communication between the inlet and the chamber, and a second state in which the inlet valve prevents fluid communication between the inlet and the chamber; and an outlet valve located upstream of the outlet spike, the outlet valve having a first outlet valve state in which the outlet valve prevents fluid communication between the chamber and the outlet, and a second outlet valve state in which the outlet valve allows fluid communication between the chamber and the outlet, wherein the outlet valve is in the first outlet valve state when the inlet valve is in the first state, wherein, when the inlet valve is in the second state, the outlet valve is moveable from the first outlet valve state to the second outlet valve state, and wherein the outlet spike is reversibly moveable in a direction towards the inlet spike such that a state of the outlet valve is changeable from the first outlet valve state to the second outlet valve state.

2. The apparatus according to claim 1, comprising a valve mechanism that forms a part of the inlet valve and the outlet valve, the valve mechanism comprising:

a release element configured to control fluid flow out of the chamber; and a stopper element configured to control fluid flow into the chamber.

3. The apparatus according to claim 2, wherein the valve mechanism is configured to move the inlet valve from the first state to the second state before the outlet valve is moved into the second outlet valve state.

4. The apparatus according to claim 2, wherein the release element is slidably received in an outlet aperture in the container and comprises a fluid conduit extending therethrough.

5. The apparatus according to claim 4, wherein the fluid conduit comprises an inlet located in the release element such that when the release element is in a first release element state, the inlet of the fluid conduit is located outside the chamber, and when the release element is in a second release element state, the inlet of the fluid conduit is located inside the chamber.

6. The apparatus according to claim 5, wherein the inlet of the fluid conduit is located in a side wall of the release element.

7. The apparatus according to claim 4, wherein the fluid conduit comprises an outlet that is in fluid communication with the outlet spike.

8. The apparatus according to claim 2, wherein the stopper element comprises:

a shaft received in a bore in the release element; and a head configured to abut a valve seat to close an inlet aperture in the container when the inlet valve is in the second state.

9. The apparatus according to claim 8, wherein the shaft is moveable within the bore of the release element.

10. The apparatus according to claim 8, wherein the valve mechanism comprises a biasing member configured to bias the stopper element into a deployed position.

11. The apparatus according to claim 1, wherein the inlet valve and the outlet valve are formed by check mechanisms.

12. The apparatus according to claim 11, wherein when the inlet valve is in the first state, an inlet valve disc extends into the chamber, and when the outlet valve is in the second outlet valve state, an outlet valve disc extends away from the chamber.

13. The apparatus according to claim 11, wherein the outlet valve has a larger crack pressure than the inlet valve.

14. The apparatus according to claim 1, wherein the container comprises a collapsible bellows.

15. The apparatus according to claim 14, wherein the collapsible bellows is moveable from an extended state to a compressed state, in which fluid pressure within the chamber maintains the inlet valve in the second state and causes the outlet valve to change from the first outlet valve state to the second outlet valve state.

16. The apparatus according to claim 1, comprising a side port located between the inlet and the inlet valve, the side port being configured to allow replenishment of the storage container.

17. The apparatus according to claim 1, wherein the inlet spike is releasably attachable to the container.

18. An apparatus for filling a medicament preparation vial with a fixed volume of diluent from a storage container, the apparatus comprising:

a container defining a chamber configured to receive the fixed volume of diluent;

an inlet comprising an inlet spike configured to be removably insertable into a port of the storage container;

an outlet comprising an outlet spike configured to be removably insertable into the medicament preparation vial;

an inlet valve located downstream of the inlet spike, the inlet valve having a first state in which the inlet valve allows fluid communication between the inlet and the chamber, and a second state in which the inlet valve prevents fluid communication between the inlet and the chamber;

an outlet valve located upstream of the outlet spike, the outlet valve having a first outlet valve state in which the outlet valve prevents fluid communication between the chamber and the outlet, and a second outlet valve state in which the outlet valve allows fluid communication between the chamber and the outlet;

a valve mechanism that forms a part of the inlet valve and the outlet valve, the valve mechanism comprising:

a release element configured to control fluid flow out of the chamber; and a stopper element configured to control fluid flow into the chamber, wherein the outlet valve is in the first outlet valve state when the inlet valve is in the first state, and wherein, when the inlet valve is in the second state, the outlet valve is moveable from the first outlet valve state to the second outlet valve state.

19. The apparatus according to claim 18, wherein the valve mechanism is configured to move the inlet valve from the first state to the second state before the outlet valve is moved into the second outlet valve state.

20. The apparatus according to claim 18, wherein the release element is slidably received in an outlet aperture in the container and comprises a fluid conduit extending therethrough.

* * * * *